United States Patent [19]

Atwater

[11] 3,858,714
[45] Jan. 7, 1975

[54] METHOD AND APPARATUS FOR DELIVERING DAMP, GRANULAR SOLIDS

[75] Inventor: Julian G. Atwater, Chicago Heights, Ill.

[73] Assignee: Swift and Company, Chicago, Ill.

[22] Filed: Jan. 22, 1973

[21] Appl. No.: 325,619

[52] U.S. Cl.................... 198/213, 198/64, 302/50
[51] Int. Cl.......................................... B65g 33/14
[58] Field of Search.......... 198/213, 64; 302/13, 59, 302/50

[56] References Cited
UNITED STATES PATENTS

| | | | |
|---|---|---|---|
| 1,957,224 | 5/1934 | Neuman | 302/59 |
| 3,269,517 | 8/1966 | Skelton | 198/64 |
| 3,726,392 | 4/1973 | Rastion | 198/213 |

*Primary Examiner*—Evon C. Blunk
*Assistant Examiner*—Jeffrey V. Nase
*Attorney, Agent, or Firm*—Edward T. McCabe; Charles E. Bouton; W. C. Davis

[57] ABSTRACT

Damp granular material is fed by first compressing and then metering at a uniform rate into a conveying path wherein the granules are conveyed at a faster speed and discharged through a window in the path.

7 Claims, 4 Drawing Figures

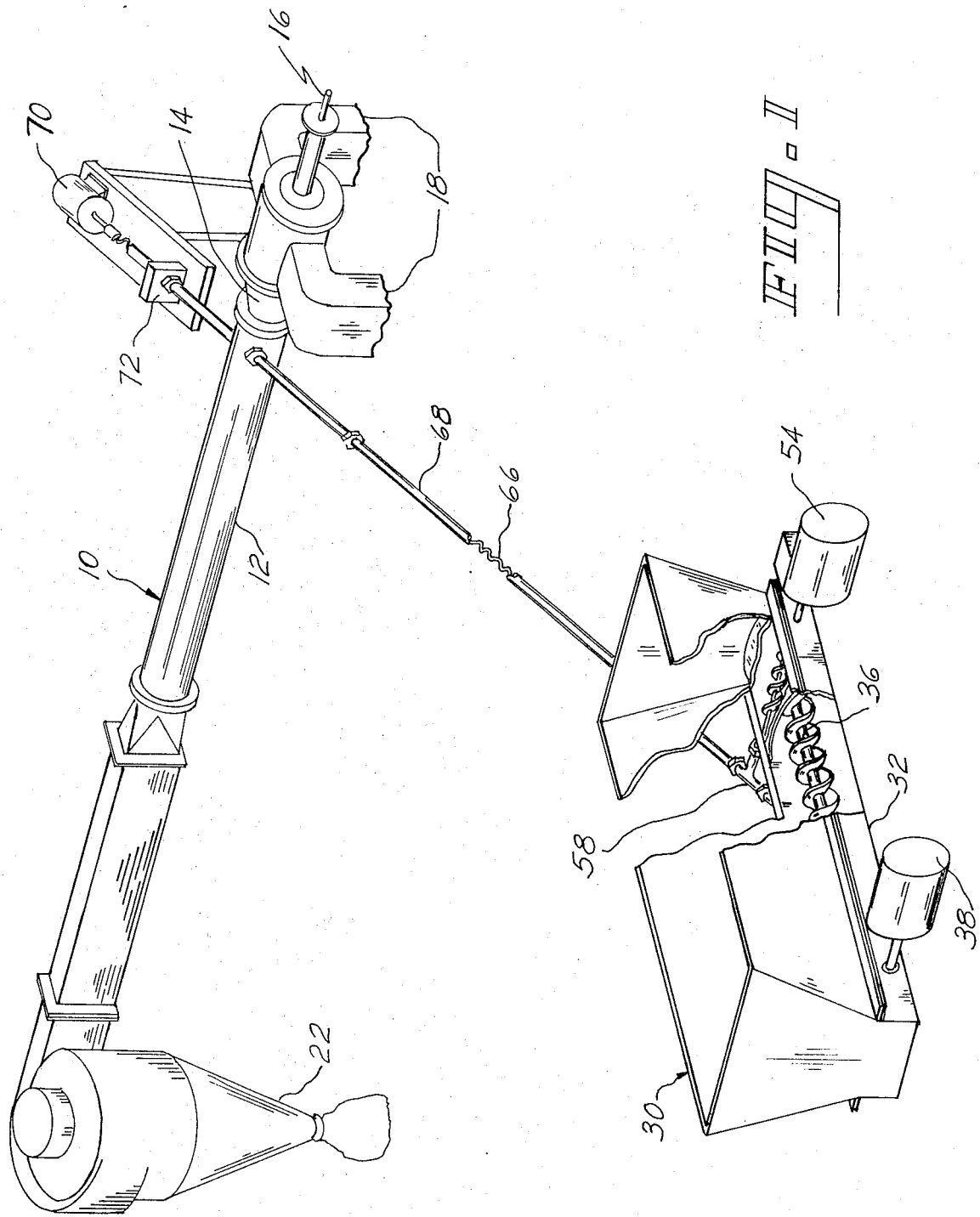

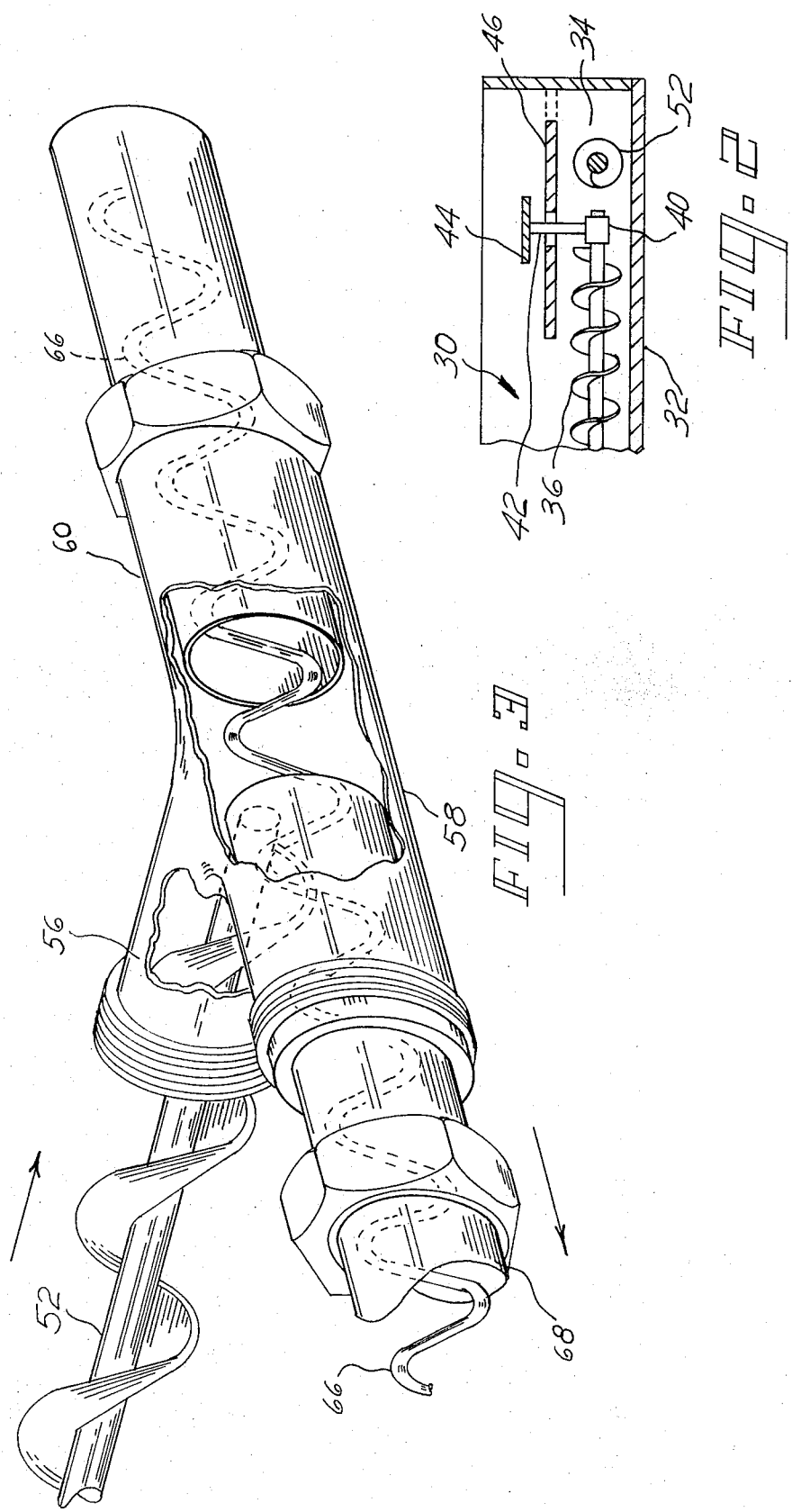

METHOD AND APPARATUS FOR DELIVERING DAMP, GRANULAR SOLIDS

The present invention pertains to a method and apparatus for delivering damp, granular solids. More specifically, the present invention is directed to an improved method and apparatus for feeding at a continuous and uniform rate, granular non-pumpable solids material that has liquid present in sufficient quantity to cause particle adhesion sufficient for moldability and bridging. A specific application of the present invention is the feeding of damp granular solids into the air stream of a spray dryer.

The handling of both liquid and dry materials are highly developed arts. Liquids and some dry particulate materials having characteristics of a fluid are pumpable and will flow readily through pipe lines and may be metered and dispensed accurately by well-known means. Similarly, solid materials may be handled by a number of techniques according to the piece or particle size. However, many damp granular materials exhibit properties that cause problems in handling that are much different from those experienced with either liquids or dry solids. For instance, damp granules will tend to stick and clump together and thereby resist flow. They are not pumpable. When stored for even brief periods of time in hoppers and supply bins, etc., the damp granules will resist removal by mechanical means and will tend to bridge over the immediate area from which a quantity of such material is removed. Accordingly, such materials have not been easily adapted for mechanically feeding and transporting under accurate rates and conditions.

Improvements in handling damp granular solids would be welcome in many industrial applications. A most significant application is in the art of drying. Many industrial processes require solid materials to be reduced in moisture content to relative low levels for storage, minimum transport expense, and ease of subsequent handling. However, drying by the application of heat is a relatively expensive process as compared to draining, pressing and centrifuging techniques which are often capable of separating a large portion, but not all, of liquid material that may be initially combined with the solids.

However, the latter techniques for reducing moisture content will result in a mass of wet solids material that is even more difficult to deliver at a uniform rate to a heated dryer for final drying.

Accordingly, it is a principle object of the present invention to provide an improved method and apparatus for the conveying of damp granular solids.

It is another object of the present invention to provide an improved method and apparatus for the uniform and continuous feeding of damp granular solids.

It is still another object of the present invention to provide an improved method and apparatus for the accurate feeding of wet solids to a spray dryer.

In general, the present invention involves the initial compressing of damp granular solids to a uniform density in a zone from which the compressed solids are continuously metered at a uniform rate. The metered solids are then conveyed at a faster uniform speed, preferably by towing the solids rather than pushing same, along a path, such as through a conduit, into a window zone from which the damp granular solids are discharged.

An improved apparatus for performing the foregoing method comprises a compression means and a metering means for feeding the compressed solids into a conveying means. The conveying means is operable at a controllable speed to advance the damp granular solids at a relatively faster speed to a window means which is also provided with a discharging means for removing the damp granular solids therefrom.

Other objects and advantages of the present invention will become apparent upon reading the following detailed specification in conjunction with the drawings wherein:

FIG. 1 is a perspective view of the over all apparatus in combination with a spray dryer;

FIG. 2 is a detailed side elevation, partially in section, of a portion of the apparatus shown in FIG. 1 constituting a compression chamber;

FIG. 3 is a detailed perspective view of a portion of the apparatus shown in FIG. 1 with certain parts removed, constituting the metering means and conveying means.

Figure 4:
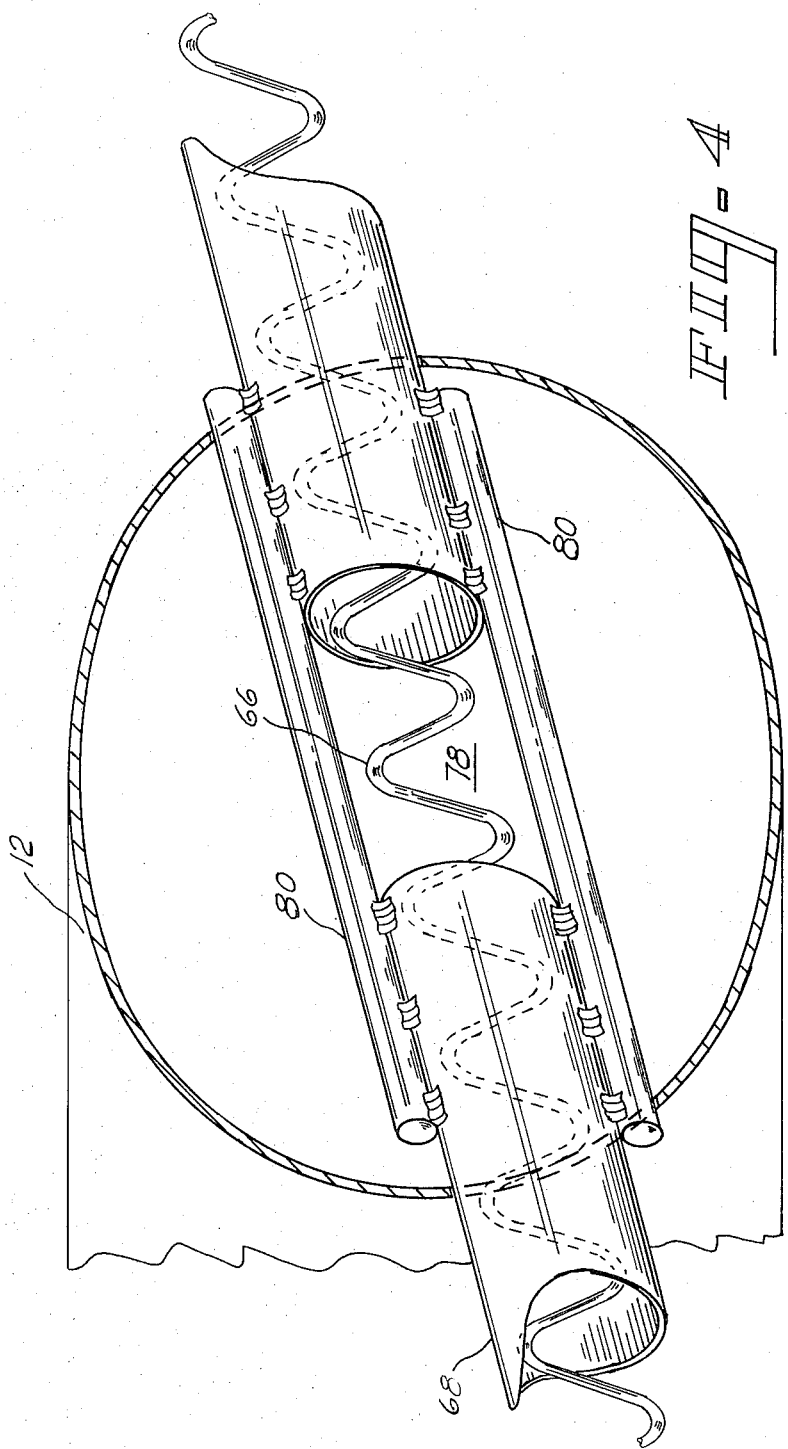
FIG. 4 is a detailed perspective view of a portion of the apparatus of FIG. 1 constituting the conveying means, window means and discharging means.

A preferred application of the present invention is in conjunction with the spray drying art however the invention is not limited to that application. In this embodiment, it is necessary that wet solids, such as moist polyvinylidene chloride cake having a moisture content of about 15% and noticeable adhesive properties, are first loosely filled into a storage bin or hopper. This material is of a nature that no further substantial quantity of moisture could be economically removed by purely mechanical means. It was necessary to deliver this material to a heated dryer for further reduction of moisture to less than ½%. The particular drying technique was selected for its ability to handle the material without thermal damage to any significant amount of the polyvinylidene chloride particles. This drying technique constitutes a jet of high velocity primary heated air within a concentric envelope of rapidly moving relatively cooler air. Such a technique is disclosed in U.S. Pat. No. 3,038,533. The specific drying technique and the drying apparatus does not form a part of the present invention other than the utilization of the jet of primary air for discharging the uniformly delivered wet granular material.

According to the present invention, the wet granular solids are first continuously moved from the loose supply and then uniformly compressed to a higher density in a compression zone. This step eliminates voids between the granules and facilitates the dispensing of accurate quantities at an even rate of feed. The compressed material is then metered at a controlled uniform rate from the compression zone and into a conveying path. The conveying path runs toward the aforementioned jet of primary air. It is necessary to pull or tow the metered material along a conveying path as it is thus controllable by the mechanical forces applied to it. The path may be in any direction horizontal, vertical, or inclined either upward or downward; although it is preferred to run the path in an upwardly inclined direction as it is thought that the greatest control over other effects, such as gravity, is obtained thereby.

Preferably the metered material is conveyed along the conveying path at a relatively faster rate of speed as contrasted to the speed at which the granules are metered from the compression zone. The intent and effect of this is to convey the granules in a "starved" condition. That is, the particles are conveyed at a rate substantially less than the capacity of the conveying means. However, they are conveyed at a uniform rate. It is also necessary that the path is open, that is it has a hollow interior and does not include any central member against which the granules could pack or become attached. This concept may be better visualized with respect to the preferred conveying means which includes a flexible wire helix within a conduit, as subsequently explained herein.

The conveyed material is moved through an open window zone which is located in the active area of a discharging means. In the preferred application of a spray dryer, the window zone is located within the path of the primary air stream and it is the latter that serves to discharge the damp granular solids from the conveying path.

It is also possible, in the preferred embodiment of the invention, to contact the granules with a treating fluid while being transported along the conveying path by passing such fluid either concurrently or countercurrently through the hollow interior of the path. For instance, air or another gas may be forced through the path to temper the granules or to partially dry the granules. Where the granules are to be discharged to an operation other than drying and necessary drying may be undertaken in this manner.

A preferred system of apparatus is shown in FIGS. 1 through 4 in combination with a spray dryer of the type disclosed in U.S. Pat. No. 3,038,533. The spray drying equipment generally 10 includes a drying tunnel 12 having a nozzle section 14 at one end through which an inner jet of primary air from a heated air source 16 and a secondary, concentric stream of relatively cooler air from a source 18 are injected. At the opposite end of the drying tunnel 12, a separator 22 is located to remove and gather the dried solid material.

According to the present invention, a hopper, generally 30 is located at a position spaced below the drying tunnel 12. The bottom of the hopper 30 is in the form of a trough 32 extending the length thereof to a compression chamber or area 34. A helical compression screw 36 extends from the opposite end of the trough 32 and ends at the entrance of the compression chamber 34. An electric motor 38 is drivingly connected to one end of the helical screw, and the terminal end at the compression chamber 34 is rotatably suspended in a bearing 40, positioned in the trough 32 by a hanger 42 depending from a crosspiece 44 that is fixed by welding or the like to the sides of the hopper, generally 30. A horizontally adjustable cover 46 is positioned over the compression chamber 34 and a portion of the helical screw 36. The cover 46 is slotted to accommodate the hanger 42 and is movable through a short distance by means of which a relief opening may be provided to the compression chamber 34. This adjustment coordinated with the speed of the helical screw 36 allows for control of the degree of compression of the wet granular material in the compression chamber 34.

A metering means comprising a metering auger 52 is positioned to extend across the compression chamber 34 at about the same plane as the axis of the helical compression screw 36 and at a right angle thereto. The metering auger 52 is drivingly connected to a speed controllable electric motor 54 mounted at one side of the trough 32. The opposite end of the metering auger 52 is floatingly supported within the stem portion 56 of a T connector 58 that extends from a port on the opposite side of the compression chamber 34. The metering auger 52 extends only to the end of the stem 56 and does not enter into the crosspiece 60 of the T connector 58.

A conveying means comprising a delivery helix 66 extends through the crosspiece 60 and then through a relatively long conduit 68 coupled to one end of the crosspiece. The conduit 68 extends to and essentially through dryer tunnel 12 and the delivery helix 66 extends beyond the conduit 68 and is drivingly connected to a motor 70 through a speed controller 72. Preferably the delivery helix is formed of a flexible wire and serves to tow or pull the wet granular solids upwardly through the conduit toward the power source electric motor 70. An advantageous characteristic of a towed flexible wire helix is the fact that when rotated under load, it will stretch, thus progressively increasing the effective pitch of the helix convolutes toward the upper end and the electric motor 70. This results in a starved condition of the helix at about the area of the drying tunnel 12 even if almost fully loaded at the area of the metering auger 52. (However, it is preferred to not fully load the helix). Within the dryer tunnel 12, the conduit 68 is interrupted to form a window or aperture 78. The conduit may be formed in two sections at this point and connected together by braces 80.

In a specific application of the invention, wet Saran granules (a trademark pertaining to a polyvinylidene chloride made by polymerizing vinylidene dichloride) containing approximately 15% moisture was compressed with a six inch diameter helical screw having 6 inch pitch to a constant density of approximately 62.4 lbs. per cubic foot in a compression chamber approximately 6 inches by 6 inches by 8 inches. The metering auger was a solid spiral conveyor 1-½ inches in diameter with 1-½ inch pitch operated at about 430 rpm to deliver about 300 pounds per hour of the wet granules. The delivery conveyor means was a helix wound from 0.177 inch stainless steel wire forming a helix 1 inch in diameter with 1-¼ inch pitch. The helix was rotated within a stainless steel tube having 1-5/16 inch inside diameter at a speed of 1,200 rpm. The tube inclined upwardly, extended approximately 11 feet from a supply to a spray dryer where approximately 2 inches of the helix was exposed to a heated primary air jet.

It will be apparent to those skilled in the art that the present invention will also have application to further processing of wet granular caked solids other than spray drying. Such other applications may include forming and shaping as by molding or casting. For example, the present invention may have application in the delivery of treated sand for the making of foundry molds. Also, the present invention may have application to the handling of wet solids other than polyvinylidene chloride. For instance, treated sand, vegetable protein meals, cakes and slurries, metal soap cakes, foods such as meats and pastes, and many other materials to be further processed such as by drying and the like.

Obviously many modifications and variations of the invention as hereinbefore set forth may be made without departing from the spirit and scope thereof, and, therefore, only such limitations should be imposed as are indicated in the appended claims.

I claim:

1. An improved method for delivering damp granular solids, said method comprising: compressing damp granular solids from a loose supply thereof into a compression zone; metering the compressed damp granular solids from said compression zone at a controlled uniform rate into a conveying path; towing the metered damp granular solids at a faster uniform speed along an open conveying path, said towing of said solids being within a conduit by a rotating flexible open helix wherein the helix carries substantially less than its capacity and wherein the pitch of the helix tends to increase by stretching when rotated; passing said damp granular solids into a window zone in said path; and discharging said damp granular solids from said path at said window zone.

2. The method of claim 1 wherein the damp granular solids are continuously compressed into a compression zone to an evenly distributed density.

3. The method of claim 1 wherein the metered damp solids are conveyed along an inclined path.

4. The method of claim 1 wherein the damp granular solids are discharged from said window zone by passing a stream of air through said window zone at an angle to said conveying path.

5. An improved apparatus for delivering damp granular solids, said apparatus comprising: a hopper having a trough in the bottom thereof; a compression chamber at one end of said trough; a helical screw rotatably mounted in said trough, said screw ending a short distance into the compression chamber for charging wet granular solids from a loose supply thereof into said compression chamber; an adjustable cover over said compression chamber; speed controllable metering means for removing said compressed wet granular solids from said compression chamber at a controllable uniform rate; an open conduit connected to receive said solids from said metering means; an open wire helix rotatable in said conduit and extending the length thereof for carrying said granular solids from said metering means through said conduit; a motor connected to an end of said wire helix distant from said metering means to rotate said helix in a direction to tow said wet granular solids from said metering means toward said motor at a speed faster than the particles are received from said metering means; window means along said conduit from which said wet granular solids may be discharged; and discharging means for removing said wet granular solids from said conduit at said window means.

6. The apparatus of claim 5 wherein said metering means is a helical auger extending across said compression chamber transverse to said compression means into the stem portion of a T connector conduit.

7. The apparatus of claim 5 wherein said window means is an opening in said conduit and said discharging means is a nozzle for delivering a stream of air through said opening and across said wire helix.

* * * * *